US011800037B2

(12) United States Patent
Ishitsuka et al.

(10) Patent No.: US 11,800,037 B2
(45) Date of Patent: Oct. 24, 2023

(54) IMAGE INSPECTING DEVICE AND IMAGE FORMING APPARATUS INCORPORATING THE IMAGE INSPECTING DEVICE

(71) Applicants: Ryoh Ishitsuka, Kanagawa (JP); Kohta Aoyagi, Kanagawa (JP); Ryosuke Ebinuma, Tokyo (JP); Satoshi Nakayama, Kanagawa (JP); Kimiharu Yamazaki, Kanagawa (JP); Tohru Matsumoto, Kanagawa (JP); Tatsuya Ishii, Kanagawa (JP)

(72) Inventors: Ryoh Ishitsuka, Kanagawa (JP); Kohta Aoyagi, Kanagawa (JP); Ryosuke Ebinuma, Tokyo (JP); Satoshi Nakayama, Kanagawa (JP); Kimiharu Yamazaki, Kanagawa (JP); Tohru Matsumoto, Kanagawa (JP); Tatsuya Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/665,931

(22) Filed: Feb. 7, 2022

(65) Prior Publication Data
US 2022/0286576 A1 Sep. 8, 2022

(30) Foreign Application Priority Data

Mar. 4, 2021 (JP) ................................. 2021-034223

(51) Int. Cl.
*H04N 1/00* (2006.01)
*G06F 3/12* (2006.01)
(Continued)

(52) U.S. Cl.
CPC ..... *H04N 1/32625* (2013.01); *H04N 1/00005* (2013.01); *H04N 1/32694* (2013.01)

(58) Field of Classification Search
None
See application file for complete search history.

(56) References Cited

U.S. PATENT DOCUMENTS

2015/0022864 A1\* 1/2015 Song ..................... G06T 7/0002
358/3.26
2015/0146264 A1\* 5/2015 Ikari ................... H04N 1/00034
358/406
(Continued)

FOREIGN PATENT DOCUMENTS

EP 1580693 A2 9/2005
JP 2000335062 \* 12/2000 .............. B41J 29/46
(Continued)

OTHER PUBLICATIONS

Extended European Search Report dated Aug. 19, 2022 issued in corresponding European Appln. No. 22154944.7.
(Continued)

*Primary Examiner* — Beniyam Menberu
(74) *Attorney, Agent, or Firm* — Harness, Dickey & Pierce, P.L.C.

(57) ABSTRACT

An image inspecting device includes an abnormality detector and circuitry. The abnormality detector is configured to detect an abnormality of an inspection object image. The circuitry is configured to set a non-detection area to be excluded from a detection object area within which the abnormality detector detects an image abnormality and set an area including an abnormality detection portion as the non-detection area when a detection result obtained by the abnormality detector satisfies a non-detection condition.

14 Claims, 10 Drawing Sheets

(51) Int. Cl.
    *G06K 15/02* (2006.01)
    *H04N 1/32* (2006.01)

(56) References Cited

U.S. PATENT DOCUMENTS

| | | | |
|---|---|---|---|
| 2017/0104884 A1* | 4/2017 | Hayashi | H04N 1/00023 |
| 2020/0089151 A1 | 3/2020 | Yoshino | |
| 2020/0096925 A1* | 3/2020 | Ikuta | G06F 3/1259 |
| 2020/0153999 A1 | 5/2020 | Itou et al. | |
| 2020/0195798 A1* | 6/2020 | Izawa | H04N 1/00037 |
| 2020/0223230 A1* | 7/2020 | Krieger | B41J 2/2142 |
| 2020/0288030 A1* | 9/2020 | Tsukamoto | H04N 1/00803 |
| 2020/0336605 A1* | 10/2020 | Kawasaki | H04N 1/00005 |
| 2021/0016584 A1 | 1/2021 | Aoyagi et al. | |
| 2021/0168253 A1 | 6/2021 | Nakayama et al. | |
| 2021/0297543 A1 | 9/2021 | Nakayama et al. | |

FOREIGN PATENT DOCUMENTS

| | | | | |
|---|---|---|---|---|
| JP | 2004220370 | * | 8/2004 | G06T 3/00 |
| JP | 2005181260 | * | 7/2005 | B41F 33/14 |
| JP | 2006245976 | * | 9/2006 | H04N 1/40 |
| JP | 2020-053761 | | 4/2020 | |
| JP | 2020088534 | * | 6/2020 | H04N 1/04 |
| JP | 2020178228 | * | 10/2020 | H04N 1/00 |

OTHER PUBLICATIONS

European Office Action dated Feb. 10, 2023 issued in corresponding European Appln. No. 22154944.7.

* cited by examiner

FIG. 4

|  |  | DENSITY LEVEL | | |
|---|---|---|---|---|
|  |  | 1 | 2 | 3 |
| DIMENSION LEVEL | 1 | · | • | ● |
|  | 2 | · | ● | ● |
|  | 3 | ● | ● | ● |

IMAGE INSPECTING DEVICE AND IMAGE FORMING APPARATUS INCORPORATING THE IMAGE INSPECTING DEVICE

CROSS-REFERENCE TO RELATED APPLICATION

This patent application is based on and claims priority pursuant to 35 U.S.C. § 119(a) to Japanese Patent Application No. 2021-034223, filed on Mar. 4, 2021, in the Japan Patent Office, the entire disclosure of which is hereby incorporated by reference herein.

BACKGROUND

Technical Field

Embodiments of the present disclosure relate to an image inspecting device and an image forming apparatus incorporating the image inspecting device.

Background Art

Various types of image inspecting devices are known to include an abnormality detector and an area setting unit. The abnormality detector detects abnormality of an inspection object image. The area setting unit sets a non-detection area that is excluded from a detection object area in which the abnormality detector detects image abnormality.

For example, a typical image inspecting device is capable of setting an end portion of a sheet (recording medium) as a non-detection area by a user instruction for the purpose of preventing false detection of image inspection due to, for example, deviation on the end portion side of the sheet. Further, the image inspecting device has a configuration in which an area that is other than the end portion of the sheet and is designated by the user instruction may also be set as a non-detection area by the user instruction.

SUMMARY

Embodiments of the present disclosure described herein provide a novel image inspecting device including an abnormality detector and circuitry. The abnormality detector is configured to detect an abnormality of an inspection object image. The circuitry is configured to set a non-detection area to be excluded from a detection object area within which the abnormality detector detects an image abnormality and set an area including an abnormality detection portion as the non-detection area when a detection result obtained by the abnormality detector satisfies a non-detection condition.

Further, embodiments of the present disclosure described herein provide an image forming apparatus including an image forming device, an image reading device, and the above-described inspecting device. The image forming device is configured to form an image on a recording medium. The image reading device is configured to read the image on the recording medium formed by the image forming device. The image inspecting device is configured to inspect a read image read by the image reading device as an inspection object image.

BRIEF DESCRIPTION OF THE SEVERAL VIEWS OF THE DRAWINGS

Exemplary embodiments of this disclosure will be described in detail based on the following figures, wherein:

FIG. 4 is a schematic diagram illustrating an abnormality level of image abnormality that is detected by an abnormality detector included in the image forming apparatus of FIG. 1;

Figure 1:
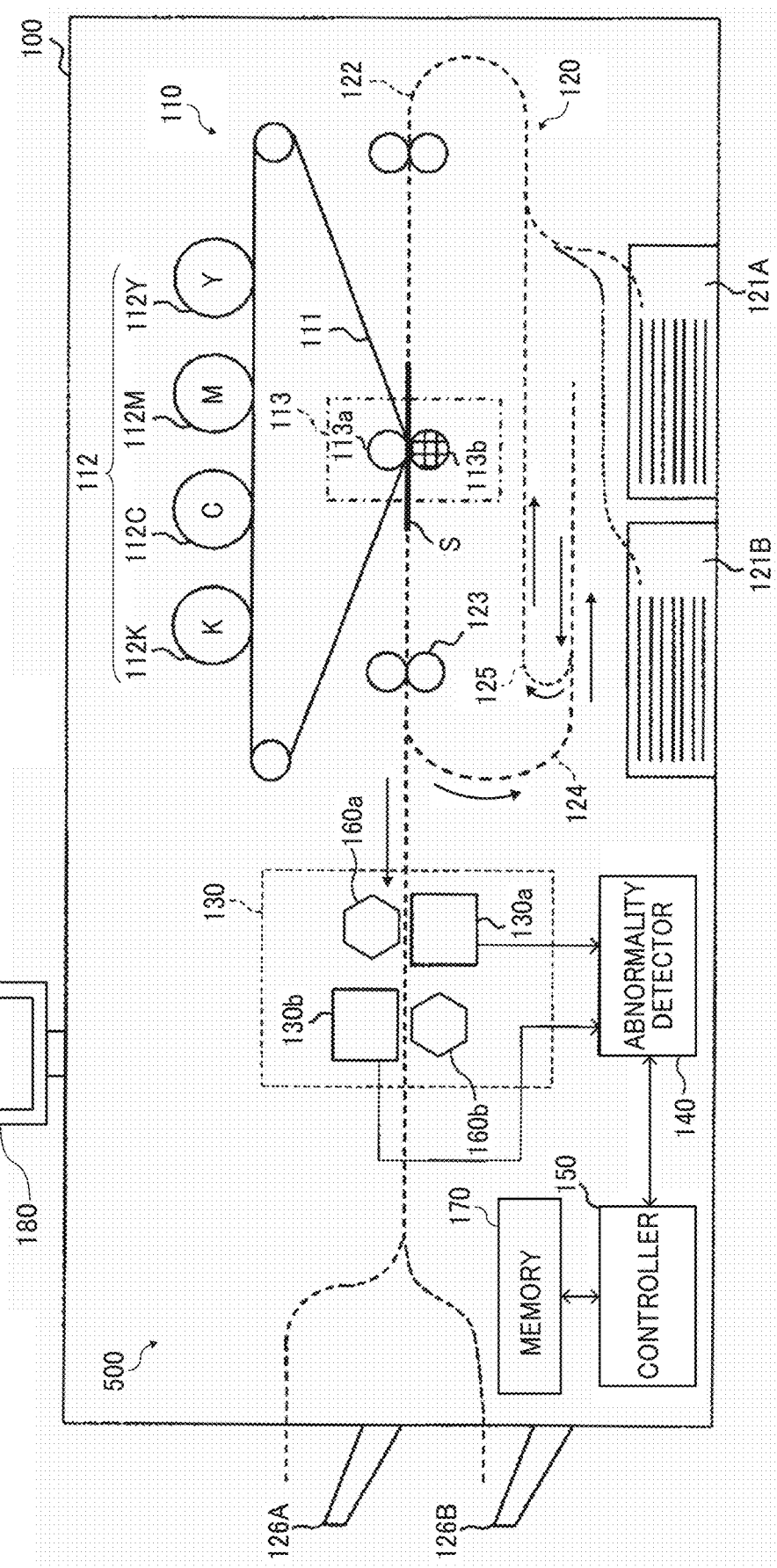
FIG. 1 is a schematic view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout.

As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, descriptions are given of configurations and functions of an image inspecting device and an image forming apparatus, according to an embodiment of the present disclosure, with reference to drawings. Note that identical parts or equivalents are given identical reference numerals and redundant descriptions are summarized or omitted accordingly. Further, note that the image inspecting device according to the present disclosure is not limited to an image inspecting device provided in an image forming apparatus and may be configured separately from the image forming apparatus.

FIG. 1 is a diagram illustrating a schematic view of a configuration of an image forming apparatus 100 according to the present embodiment.

The image forming apparatus 100 according to the present embodiment includes an image forming device 110, a sheet conveyor 120, an image reading device 130, an abnormality detector 140, a controller 150, and background holders 160*a* and 160*b*, and a memory 170. The abnormality detector 140 and the controller 150 are included in an image inspecting device 500 according to the present embodiment.

The image forming device 110 includes four photoconductor drums 112Y, 112M, 112C, and 112K corresponding to images of respective colors of yellow (Y), magenta (M), cyan (C), and black (K) each being an image forming material such as toner. Electrostatic latent images of respective colors are formed by electrophotography on the photoconductor drums 112Y, 112M, 112C, and 112K based on image information. Then, respective colors of toners are applied to the respective electrostatic latent images to develop the respective electrostatic latent images to visible toner images.

The four photoconductor drums 112Y, 112M, 112C, and 112K are disposed along an intermediate transfer belt 111 having an endless loop. The intermediate transfer belt 111 functions as an intermediate transfer body. The intermediate transfer belt 111 is wound around at least one drive roller and a plurality of driven rollers and moves between a primary transfer position and a secondary transfer position. The first transfer position is a position where images (toner images of respective single colors) developed on the photoconductor drums 112Y, 112M, 112C, and 112K are primarily transferred and overlaid on one after another to form a color toner image. The color toner image that was primarily transferred onto the surface of the intermediate transfer belt 111 is conveyed to the secondary transfer position at which the color toner image is secondarily transferred onto a sheet S along with rotation of the intermediate transfer belt 111.

A transfer device 113 is disposed at the secondary transfer position. The transfer device 113 includes a transfer roller 113*a* and a counter roller 113*b* that is disposed facing the transfer roller 113*a*. The sheet S is conveyed to the transfer device 113 in synchrony with the timing at which the toner image formed on the surface of the intermediate transfer belt 111 reaches the secondary transfer position. The transfer device 113 transfers the toner image formed on the surface of the intermediate transfer belt 111 onto the sheet S that is conveyed in a conveyance direction of the sheet S (sub-scanning direction). As a result, the image is formed on the sheet S.

The sheet conveyor 120 includes sheet feed trays 121A and 121B, a conveyance passage 122, a fixing roller pair 123, a conveyance passage switcher 124, and a reversal passage 125. The sheet feed trays 121A and 121B each loads the sheet S. The conveyance passage 122 is provided with a plurality of roller pairs to convey the sheet S. The fixing roller pair 123 is disposed downstream from the transfer device 113 in the conveyance direction of the sheet S. When the image forming operation is performed, under control of the controller 150, the sheet S that is loaded in one of the sheet feed trays 121A and 121B is separated by a pickup roller, conveyed along the conveyance passage 122, and reaches the transfer device 113. In this transfer process of the transfer device 113, an image is formed on one side (first face) of the sheet S.

The sheet S having the image on the first face is further conveyed, so that the toner image is fixed to the sheet S by the fixing roller pair 123. Then, the sheet S is conveyed to the conveyance passage switcher 124 disposed downstream from fixing roller pair 123 in the conveyance direction of the sheet S. Then, the travel direction of the sheet S is reversed in the conveyance passage switcher 124. The sheet S is then conveyed to the reversal passage 125. The sheet S is then conveyed to the secondary transfer position again, with the back face (second face) of the sheet S facing the intermediate transfer belt 111 at the secondary transfer position. In this transfer process of the transfer device 113, an image is formed on the second face of the sheet S. The sheet S having the image on the second face is further conveyed, so that the toner image on the second face of the sheet S is fixed to the sheet S by the fixing roller pair 123. Then, the sheet S is conveyed to the image reading device 130 disposed downstream from the fixing roller pair 123 in the conveyance direction of the sheet S. The sheet S that has passed through the image reading device 130 is ejected to one of sheet ejection trays 126A and 126B.

The image reading device 130 includes readers 130*a* and 130*b*. The reader 130*a* reads the front face of the sheet S. The reader 130*b* reads the second face of the sheet S. The readers 130a and 130b have the similar configuration to each other in the present embodiment. However, the reader 130a and the reader 130b may have different configurations from each other. The reader 130a reads an image formed on the sheet S at the position facing the background holder 160a, in other words, the sheet S between the reader 130a and the background holder 160a and outputs the read information to the abnormality detector 140. Similarly, the reader 130b reads an image formed on the sheet S at the position facing the background holder 160b, in other words, the sheet S between the reader 130b and the background holder 160b and outputs the read information to the abnormality detector 140.

Figure 2:
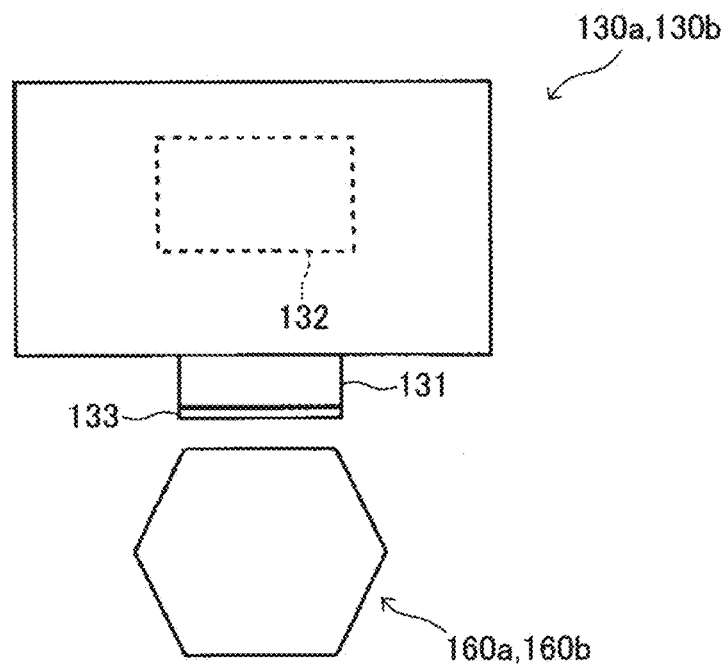
FIG. 2 is a schematic diagram illustrating a configuration of an image reading device included in the image forming apparatus of FIG. 1.

FIG. 2 is a schematic diagram illustrating an example of a configuration of each of the readers 130a and 130b in the image forming apparatus 100, according to the present embodiment.

Each of the readers 130a and 130b includes an irradiation unit 131, a line image sensor 132, and a cover glass 133. The irradiation unit 131 irradiates the sheet S with light when the sheet S passes through the reading position. The line image sensor 132 includes a plurality of light receiving elements that perform photoelectric conversion for each pixel. The light receiving elements are disposed in a one-dimensional shape in a width direction of the sheet S (i.e., direction orthogonal to the conveyance direction of the sheet S, that is, main scanning direction). The light emitted from the irradiation unit 131 passes through the cover glass 133 and is reflected by the sheet S. The reflection light passes through the cover glass 133 and is incident on the line image sensor 132.

Under control of the controller 150, the readers 130a and 130b repeatedly perform a reading operation for one line extending in the width direction of the sheet in synchrony with the conveyance of the sheet S that passes the reading position. By so doing, the readers 130a and 130b each reads the image printed on the sheet S as a two-dimensional image.

Note that the irradiation unit 131 and the line image sensor 132 of the reader 130a are disposed below the conveyance passage of a sheet. By contrast, in the reader 130b, the irradiation unit 131 and the line image sensor 132 are disposed above the conveyance passage of a sheet. On the other hand, the background holder 160a disposed within the reading area of the reader 130a is disposed above the conveyance passage of a sheet and the background holder 160b disposed within the reading area of the reader 130b is disposed below the conveyance passage of a sheet.

Figure 3:
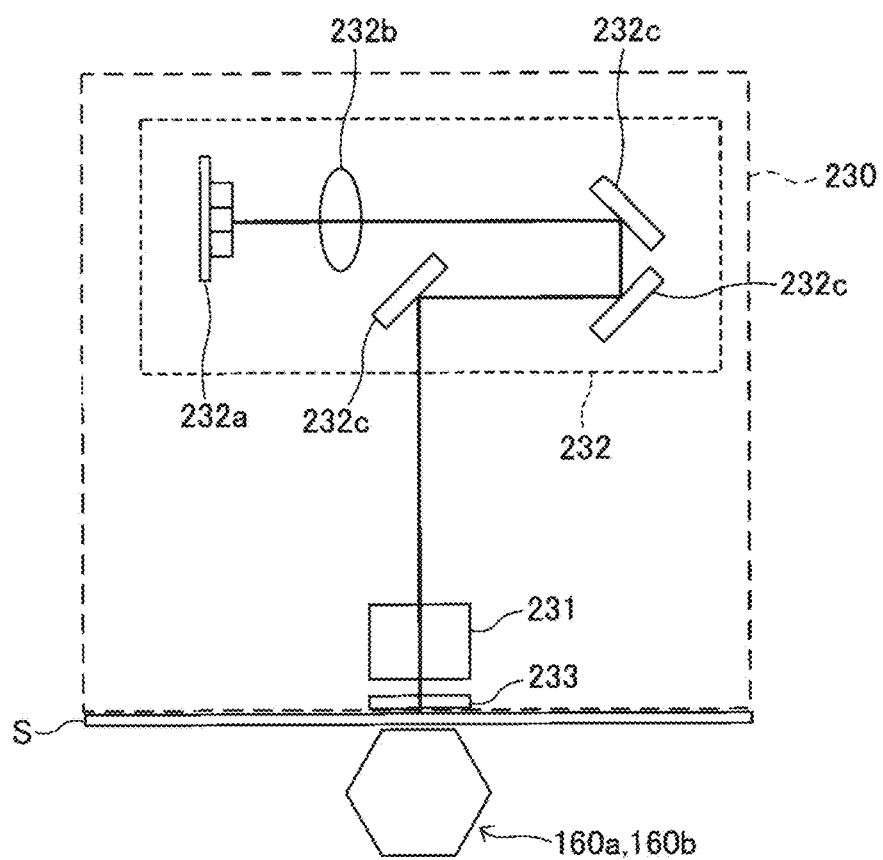
FIG. 3 is a schematic diagram illustrating another configuration of the image reading device included in the image forming apparatus of FIG. 1.

FIG. 3 is a schematic diagram illustrating another configuration of the image reading device 130 included in the image forming apparatus 100 of FIG. 1.

The readers 130a and 130b according to the present embodiment each includes a line image sensor but may employ an area sensor in which the light receiving elements are disposed in a two-dimensional manner or an imaging device such as a camera.

Further, the readers 130a and 130b according to the present embodiment may be a scanner 230 as illustrated in FIG. 3. The scanner 230 includes an irradiation unit 231, a reading device 232, and an exposure glass 233. The irradiation unit 231 irradiates the sheet S with light when the sheet S passes the reading position. The reading device 232 includes an image sensor 232a, a lens 232b, and mirrors 232c. Light emitted from the irradiation unit 231 passes through the exposure glass 233 to be reflected on the sheet S. The reflection light passes through the exposure glass 233 to be incident on the reading device 232 and is received by the image sensor 232a.

The abnormality detector 140 detects image abnormality based on the read information obtained by reading the image formed on the sheet S by the image reading device 130. Image abnormality represents a defect occurred in an image portion that is not an image (intended image) based on the image information, that is, a defect that is occurred in an image. Specifically, the defect appears on an image and includes spot stain (e.g., black spot), void (e.g., white spot), and streak (e.g., black streak and white streak). "Spot stain (black spot) is a defect generated due to toner adhered to an unintended portion. "Void (white spot)" is a defect that toner does not adhere to a portion to which toner is to adhere (toner is void). "Streak" is an unintended linear image and includes a black streak (i.e., streak having a density higher than the density of a part around the streak) and a white streak (i.e., streak having a density lower than the density of a part around the streak). Further, such a defect also includes a vertical streak along the conveyance direction of a sheet, a horizontal streak along the width direction of the sheet, and an oblique streak in the oblique direction to the conveyance direction of the sheet.

The abnormality detector 140 according to the present embodiment detects various image abnormalities described above, for example, by detecting an image portion having a density abnormality in which the density of the image is different from an intended density (target density based on image information or an image forming condition), in other words, by detecting an image portion having a density difference exceeding an allowable range with respect to the target density. Specifically, the abnormality detector 140 compares a read image based on the read information with a reference image having no image abnormality, in other words, with an image based on the image data when the image on the sheet S is formed, so as to detect an image abnormality. When an image abnormality is detected, the abnormality detector 140 outputs detection result information including the position, type, and abnormality level (degree of abnormality) of the image abnormality, to the controller 150.

Figure 4:
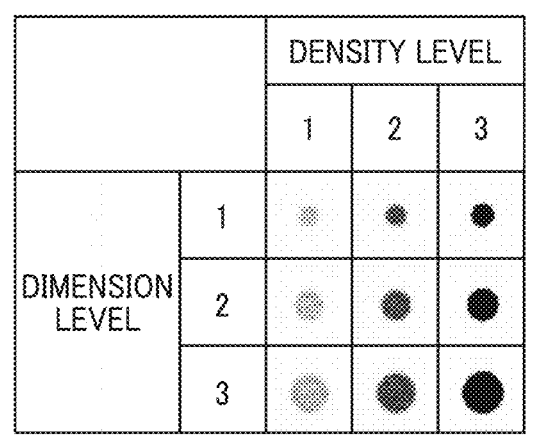

FIG. 4 is a schematic diagram illustrating an abnormality level of image abnormality that is detected by an abnormality detector included in the image forming apparatus of FIG. 1.

The abnormality level of the image abnormality detected by the abnormality detector 140 is classified into levels based on, for example, a difference in dimension (dimension level), for example, size of a point-like stain or thickness of a streak, and a difference in density (density level) that is a density difference from the target density. Specifically, as illustrated in FIG. 4, sizes (dimensions) of multiple levels of the image abnormalities of point-like stains are classified into three levels and defined as Dimension Levels 1 to 3 and densities of multiple levels of the image abnormalities of point-like stains are classified into three levels and defined as Density Levels 1 to 3. For example, in a case in which an image abnormality in Dimension Level 2 was detected and an image abnormality in Dimension Level 1 was not detected, the abnormality level of the dimension is 2. The same manner is applied to the "density level."

The controller 150 controls the overall operation of the image forming apparatus 100 and a series of processes and operations for forming an image on a sheet S as a sheet-shaped recording medium. In addition, the controller 150 executes processes when the abnormality detector 140 has detected image abnormality. For example, the controller 150 determines whether to allow detected image abnormality or not, based on an optional set value set in advance. The optional set value is a boundary value used for determining whether the detected image is an abnormal image or not. When the abnormality level of the image abnormality exceeds the optional set value, the controller 150 executes processing of the image abnormality (for example, handling the recording medium having the image abnormality is dealt as a waste sheet). On the other hand, when the abnormality level of the image abnormality is within the optional set value, the controller 150 does not execute the processing of the image abnormality.

Further, the controller 150 stores the detection result information that is output from the abnormality detector 140, in the memory 170. Further, the controller 150 functions as an area setting unit and executes an area setting process that sets the non-detection area that is excluded from a detection object area in which the abnormality detector 140 detects image abnormality. In the area setting process according to the present embodiment, when the detection result information stored in the memory 170 satisfies a predetermined non-detection condition, an area including an abnormality detection portion corresponding to a detection result satisfying the non-detection condition is set as a non-detection area.

The memory 170 is configured by a storage device such as a ROM or a RAM and stores detection result information of the abnormality detector 140 as described above. Note that, in FIG. 1, the memory 170 is illustrated separately from the controller 150. However, the memory 170 may be a storage device included in the controller 150.

Next, a description is given of false detection (false detection of image abnormality) that may occur in the image inspection according to the present embodiment.

Figure 5A:
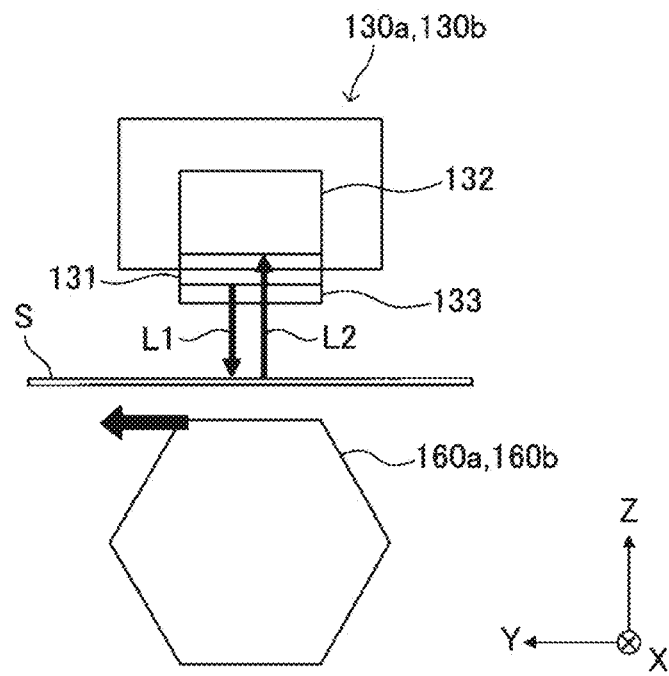
FIG. 5A is a diagram illustrating the image reading device, viewed in the width direction of a sheet (X direction in this figure)

FIG. 5A is a diagram illustrating the image reading device 130 according to the present embodiment, viewed in the width direction of a sheet (X direction in this figure).

Figure 5B:
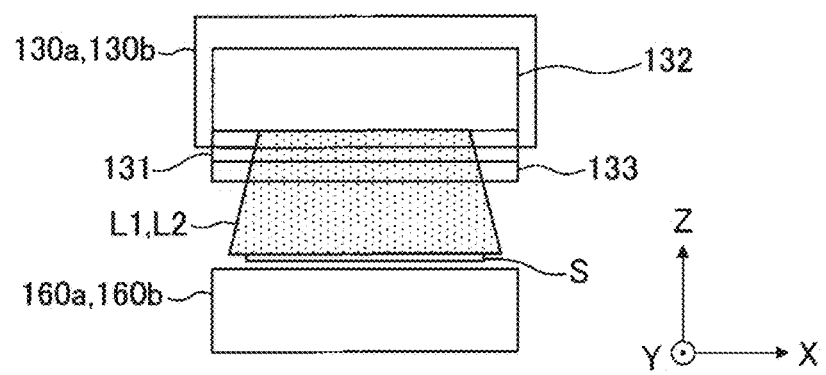
FIG. 5B is a diagram illustrating the image reading device, viewed in the conveyance direction of a sheet (Y direction in this figure)

FIG. 5B is a diagram illustrating the image reading device 130 according to the present embodiment, viewed in the conveyance direction of a sheet (Y direction in this figure).

Figure 5C:
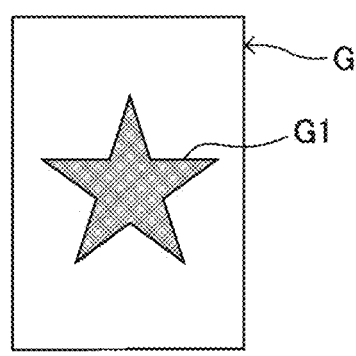
FIG. 5C is a diagram illustrating a read image that is an image generated by reading the image on a sheet S by the image reading device.

FIG. 5C is a diagram illustrating a read image G that is an image generated by reading the image on the sheet S by the image reading device 130 according to the present embodiment.

As described above, the readers 130a and 130b of the image reading device 130 each irradiates light L1 that is emitted from the irradiation unit 131 on the sheet S via the cover glass 133. Reflection light L2 then passes through the cover glass 133 and is incident on the line image sensor 132. By so doing, the image on the sheet S is read. Specifically, the reader 130a starts to perform the reading operation immediately before the sheet S that is conveyed in the conveyance direction of the sheet S (Y direction in this figure) passes between the reader 130a and the background holder 160a and finishes (ends) the reading operation immediately after the sheet S has passed. Similarly, the reader 130b starts to perform the reading operation immediately before the sheet S that is conveyed in the conveyance direction of the sheet S (Y direction in this figure) passes between the reader 130b and the background holder 160b, and finishes (ends) the reading operation immediately after the sheet S has passed. Accordingly, the images on the sheet S are acquired one by one as a read image G. For example, a read image G of the sheet S as illustrated in FIG. 5C (image including the star-shaped image G1 on the sheet S) is obtained.

Figure 6A:
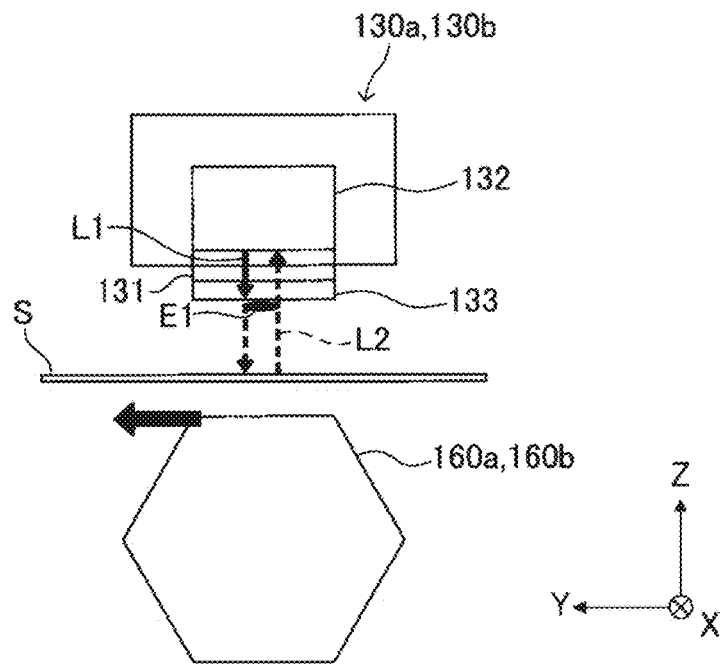
FIGS. 6A, 6B, and 6C are diagrams corresponding to FIGS. 5A, 5B, and 5C, respectively, and each illustrating a state in which a foreign material is attached on the outer surface of a cover glass.
Figure 6B:
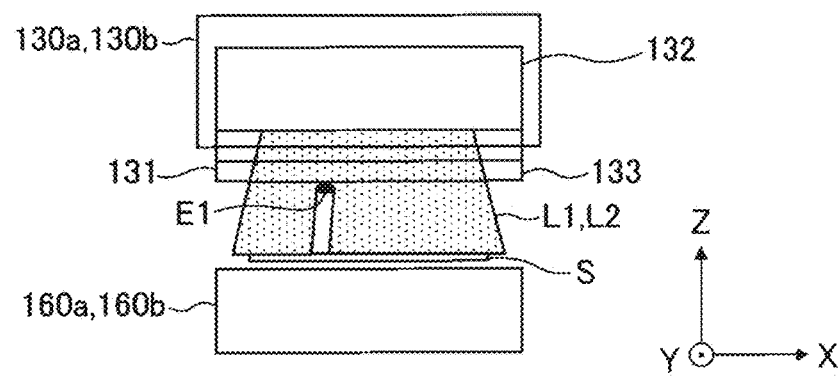
Figure 6C:
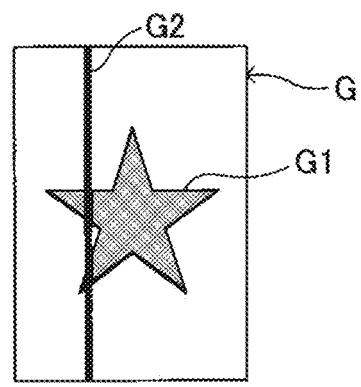

FIGS. 6A, 6B, and 6C are diagrams corresponding to FIGS. 5A, 5B, and 5C, respectively, and each illustrating a state in which a foreign material E1 is attached on the outer surface of the cover glass 133.

While an image forming operation is performed, foreign materials such as paper dust generated from an end portion of a sheet is likely to adhere to the cover glass 133. In this case, the light L1 emitted from the irradiation unit 131 is blocked by the foreign material E1, and the reflection light L2 from the image portion formed on the portion on the sheet S to which the blocked light is to be irradiated is not incident on the line image sensor 132, and an image abnormality appears in the read image.

For example, as illustrated in FIGS. 6A and 6B, when the foreign material E1 adheres to a part of the cover glass 133 in the width direction of the sheet S, a black streak G2 (black streak extending in the conveyance direction of the sheet S) corresponding to the part in the width direction of the sheet S appears in the read image, as illustrated in FIG. 6C. The black streak G2 appears on the read image G but does not exist on the image on the sheet S. Therefore, a determination that the black streak G2 has an image abnormality causes false detection (false detection of an image abnormality) in the image inspection on the sheet S.

Figure 7A:
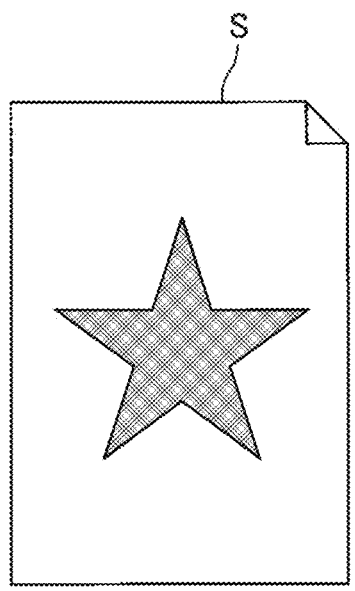
FIG. 7A is a diagram illustrating a sheet having another example of false detection that may occur in an image inspection according to an embodiment of the present disclosure.
Figure 7B:
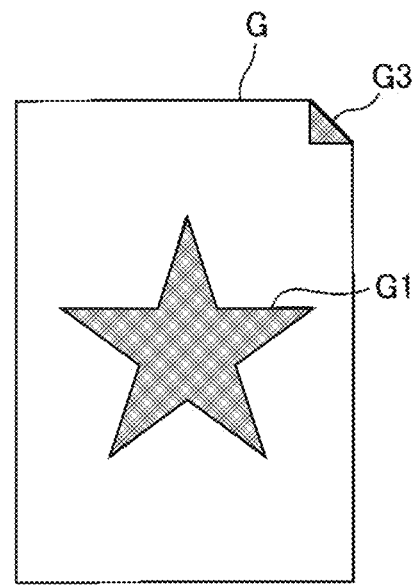
FIG. 7B is a diagram illustrating a read image formed by reading the image on the sheet of FIG. 7A.

FIGS. 7A and 7B are diagrams each illustrating a sheet having another example of false detection that may occur in an image inspection according to the present embodiment.

As illustrated in FIG. 7A, the sheet S having an image to be read by the image reading device 130 is likely to be folded or bent at a corner of a sheet. Such a fold or bent at the corner of a sheet occurs due to, for example, a corner of a sheet bundle being hit against something when a user stores the sheet bundle in the sheet feed tray 121A or the sheet feed tray 121B. When an image of the sheet S having such a fold or bent is read, the reflection light reflected on the fold or bent is not appropriately incident to the line image sensor 132. In this case, for example, as illustrated in FIG. 7B, a folded portion G3 appears at a corner of the read image G. The folded portion G3 has the same color as the background color of the sheet (for example, white) or has a gray color depending on the manner of reflection of light. The folded portion G3 appears on the read image G but does not exist on the image on the sheet S. Therefore, a determination that the folded portion G3 has an image abnormality causes false detection (false detection of an image abnormality) in the image inspection on the sheet S.

Note that, when the sheet bundle to be stored in the sheet feed tray 121A or the sheet feed tray 121B is cut, it is likely that a cutting defect occurs at the end portion of the sheet bundle or that the sheet is conveyed to the image reading device 130 in a skewed state. In such cases, an image such as the folded portion G3 can appear on the read image G at a corresponding position. In this case, false detection (false detection of image abnormality) of the image inspection on the sheet S can occur.

It is difficult to predict occurrence of false detection factors that cause false detection as described above, before the start of image inspection. Such false detection factors include, for example, adhesion of the foreign material E1 to the cover glass 133, folding or bending of a sheet, a sheet cutting defect, and sheet skew. Even if occurrence of false detection factors is predicted, it is difficult to identify a position where the false detection factors occur. In particular, in a case in which image inspection of each sheet is sequentially performed in a continuous image forming operation (in a job of performing image formation on a plurality of sheets), the false detection factor described above can occur in the middle of the continuous image forming operation. In this case, it is difficult to predict the occurrence of a false detection factor before the image inspection is started (before the continuous image forming operation is started).

In typical image inspecting devices, in order to prevent false detection of image inspection caused by, for example, twisting of the end side of the sheet, when four sides of a sheet after image formation are cut, a sheet end area before the cutting of the four sides of the sheet (an area some centimeters away from the four sides of the sheet) is set as a non-detection area before the start of the image inspection. In this case, since image inspection (detection of image abnormality) is not uniformly performed in the sheet end area, such typical image inspecting devices can restrain false detection of image inspection caused by false detection factors (e.g., folding or bending of the sheet, sheet cutting defect, sheet skew) that can occur in the sheet end area.

However, in the typical image inspecting devices, when the four sides of the sheet are not cut after the image formation, the whole image portions formed in the sheet end area are not uniformly inspected. In this case, even when an abnormality actually occurs in an image portion formed in the sheet end area, the image abnormality cannot be detected, and thus omission of detection of an abnormal image is likely to occur.

In addition, a current method in which the sheet end area is uniformly set as the non-detection area cannot restrain false detection of the image inspection caused by false detection factors (e.g., adhesion of a foreign material E1 to the cover glass 133) that can occur in an area other than the sheet end area.

In addition, the typical image inspecting devices can use a method in which a user designates an area other than the sheet end portion and sets the area as the non-detection area before starting the image inspection. However, since the user cannot predict a false detection factor that occurs in the middle of the image inspection before starting the image inspection, false detection of the image inspection caused by such a false detection factor cannot be restrained.

In order to address these inconveniences, the image inspecting device 500 according to the present embodiment causes the memory 170 to store the detection result of the abnormality detector 140 in the image inspection, in other words, in the continuous image forming operation (job). Then, when the detection result stored in the memory 170 satisfies a predetermined non-detection condition, the controller 150 sets an area including an abnormality detection portion corresponding to the detection result satisfying the non-detection condition as a non-detection area.

Figure 8:
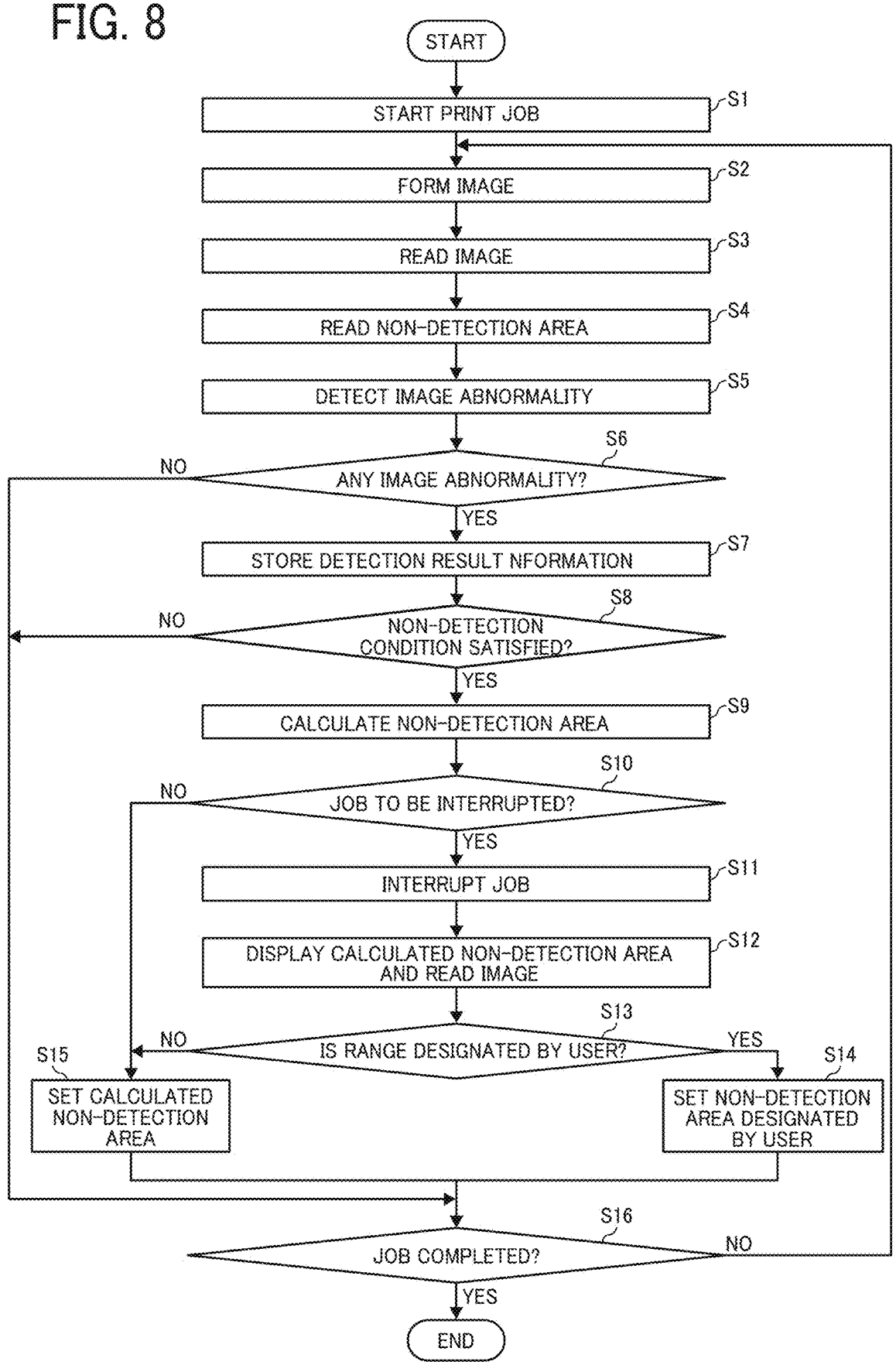
FIG. 8 is a flowchart of the image inspection according to an embodiment of the present disclosure.

FIG. 8 is a flowchart of the image inspection according to the present embodiment. In the following description, a description is given of an image forming operation (print job) for producing a plurality of print documents by continuously printing a plurality of pages of printed materials in page order.

In the present embodiment, as an instruction is input to start an image forming operation (print job) (S1), the image forming device 110 forms an image on the sheet S based on image information of each page of a print document with respect to the print job (S2). Then, the sheet S on which the image is formed by the image forming device 110 is conveyed to the reading area of the image reading device 130, so that the image reading device 130 reads the image on the sheet S (S3). Specifically, in the present embodiment, the image reading device 130 sequentially reads the images of the sheets S each time the sheet S on which the image is formed passes through the reading area in the continuous image forming operation. The read image read by the image reading device 130 is sent to the abnormality detector 140.

The abnormality detector 140 reads setting information of a non-detection area set as described below, from the memory 170 (S4). Then, the abnormality detector 140 sets the read image received from the image reading device 130 as an inspection object image and compares the inspection object image with a reference image having no image abnormality, in other words, an image based on image information obtained when an image on the sheet S is formed. By so doing, the abnormality detector 140 detects an image abnormality (S5). Then, the abnormality detector 140 outputs detection result information about the read image (e.g., position of image abnormality and shape dimension of the image abnormality) to the controller 150. At this time, even if an image abnormality is detected in the image portion corresponding to the non-detection area, it is not detected that the image portion has an image abnormality, and the detection result information of the image portion is not output to the controller 150.

Then, the controller 150 determines whether or not the abnormality detector 140 detects image abnormality (S6). When the abnormality detector 140 does not detect an image abnormality (NO in S6), the controller 150 then determines whether the print job is completed, in other words, whether the whole image formation by the amount designated in the print job is finished (S16). When the print job is completed (YES in S16), the process of the flowchart of FIG. 8 ends. When the print job is not completed (NO in S16), the process goes back to step S2 to continue the image formation and the image inspection (S2 to S15).

When the abnormality detector 140 has detected an image abnormality (YES in S6), the controller 150 then determines whether the detected image is an abnormal image or not based on the detection result information that is output from the abnormality detector 140. In this determination, when the abnormality level of the image abnormality exceeds the optional set value, the controller 150 executes processing of the image abnormality (for example, the recording medium having the image abnormality is dealt as a waste sheet). On the other hand, when the abnormality level of the image abnormality is within the optional set value, the controller 150 does not execute the processing of the image abnormality. The optional set value at this time is input before starting a print job, for example, by the user operating a control panel 180 that functions as an instruction receiver of the image inspecting device 500 of the image forming apparatus 100. Specifically, the image inspecting device 500 according to the present embodiment includes the control panel 180.

Further, when the abnormality detector 140 has detected an image abnormality (YES in S6), the controller 150 causes the memory 170 to store the detection result information received from the abnormality detector 140 (S7). Further, the controller 150 that functions as an area setting unit executes the area setting process to set the non-detection area that is excluded from the detection object area in which the abnormality detector 140 detects image abnormality. To be more specific, the controller 150 determines whether the detection result information that is stored in the memory 170 satisfies a predetermined non-detection condition (S8). When the detection result information in the memory 170 does not satisfy the predetermined non-detection condition (NO in S8), the controller 150 then determines whether the print job has been finished, in other words, whether the whole image formation by the amount designated in the print job has been completed (S16). On the other hand, when the detection result information in the memory 170 satisfies the predetermined non-detection condition (YES in S8), the controller 150 calculates the non-detection area including an abnormality detection portion (position of the image abnormality) that corresponds to the detection result in accordance with the non-detection condition (S9).

Figure 9:
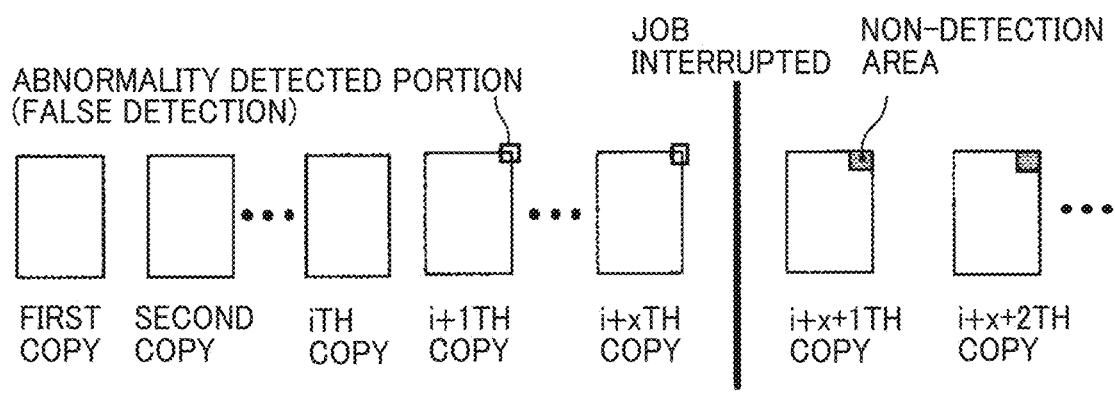
FIG. 9 is a diagram illustrating a non-detection condition according to an embodiment of the present embodiment.

FIG. 9 is a diagram illustrating a non-detection condition according to an embodiment of the present embodiment.

As an example, as illustrated in FIG. 9, the non-detection condition is a condition that abnormalities are detected at close positions in the specified number "x" of read images (or specified amount of read images) that are consecutively input. The close positions are substantially same positions to each other and are not the positions that are completely coincident with each other. The controller 150 refers to the detection result information that is stored in the memory 170 since the start of the present print job and determines whether the non-detection condition in which abnormalities are detected at close positions in the specified number "x" of read images that are consecutively input is detected is satisfied (S8).

In the example of FIG. 9, an image abnormality is detected at a position corresponding to the upper right corner of the sheet S in the (i+1)th copy after the start of the print job. Thereafter, image abnormalities having the substantially same shape dimensions as the image abnormality on the (i+1)th copy are consecutively detected by the specified number "x" of read images at the position of the upper right corner of each sheet S. The shape dimensions do not need to completely match to each other and include dimensions, for example, of the same shape and the different dimension and of the same dimension and different shape. In this case, it is determined that the detection result information in the memory 170 satisfies the predetermined non-detection condition (YES in S8), and the controller 150 calculates the non-detection area including an abnormality detection portion (position and size of the image abnormality) that corresponds to the detection result in accordance with the non-detection condition (S9).

Note that the specified number "x" may be a fixed numerical value determined in advance or may be a numerical value that is changeable by a user instruction. In a case in which the specified number "x" is changeable by a user instruction, a user operates the control panel 180 that functions as an instruction receiver of the image inspecting device 500 of the image forming apparatus 100, for example, before the start of a print job. By so doing, the specified number "x" is designated.

In an example illustrated in FIG. 9, when image abnormality is detected at the substantially same positions (close positions) in the specified number "x" of read images that are consecutively input, the controller 150 determines that the image abnormality is false detection and sets the non-detection area so as not to be detected as image abnormality after the detection. When the false detection factors that cause false detection as described above (e.g., adhesion of the foreign material E1 to the cover glass 133, folding or bending of a sheet, a sheet cutting defect, and sheet skew) occur, it is normal that such false detection factors continuously occur at the substantially same positions (close position) on each of the following sheets. On the other hand, in a case in which an image abnormality actually occurs on a sheet, the image abnormality generally occurs discontinuously at the substantially same positions. Therefore, the controller 150 determines whether or not the detected image abnormality is false detection based on the above-described non-detection condition and sets an appropriate non-detection area.

Supplementally, for example, an image abnormality such as a black spot occurs when a lump of toner accumulated in the image forming apparatus falls and adheres to the sheet S. Therefore, another black spot does not occur for a while (until the toner is accumulated again) after the black spot occurs once.

In addition, for example, an image abnormality such as a black spot or a white spot may be generated by a small scratch (local scratch) on the surface of the photoconductor(s) in the image forming apparatus. In such a case, although such a scratch is likely to continue to occur after the scratch occurs once, the relation of the position of the scratch on the photoconductor and the position on the sheet corresponding to the scratch do not normally coincide with each other, and the relation of the positions is different for each sheet. Accordingly, such an image abnormality does not continuously occur at the substantially same positions (close positions).

In addition, for example, an abnormal image such as a black streak or a white streak is generated by a stripe-shaped scratch (scratch extending in the circumferential direction of the photoconductor) generated on the surface of the photoconductor due to a foreign material generated on the cleaning blade. Such an abnormal image is likely to continuously generated once the abnormal image has been generated. However, since such a stripe-shaped image on the surface of the photoconductor is normally generated on one of four photoconductors, a stripe-shaped image is generated on a single toner image alone of a color formed by the one photoconductor. Due to such a configuration, whether or not a black streak or a white streak that exceeds an allowable range occurs depends on the content of an image (four color superimposed toner image) formed on a sheet. The content of an image includes, for example, which color is used in which image portion and to what extent. Therefore, a black streak or a white streak does not continuously occur in a normal print job (normal continuous image forming operation) in which images having different contents are formed on continuous sheets as in the case of producing a printed document such as a booklet having a plurality of pages.

As described above, even when an image abnormality that is actually generated on a sheet discontinuously occurs at the substantially same positions or consecutively occurs at the substantially same positions, the number of continuous occurrences of the image abnormality is smaller than the specified number "x". Due to this configuration, in accordance with the above-described non-detection condition, the controller 150 appropriately determines that an image abnormality caused by continuously occurring false detection factors is false detection and sets a non-detection area.

FIGS. 10A to 10D are diagrams each illustrating the setting of the non-detection area. When the detection result information satisfies the predetermined non-detection condition, the controller 150 calculates the area within the predetermined range including an abnormality detection portion (position of the image abnormality erroneously detected) that corresponds to the detection result in accordance with the non-detection condition, as the non-detection area. For example, in the present embodiment, since the shape dimensions of the image abnormality are included in the detection result information stored in the memory 170, the controller 150 calculates the range (position and size) of the non-detection area from the position and shape dimensions of the image abnormality.

Figure 10A:
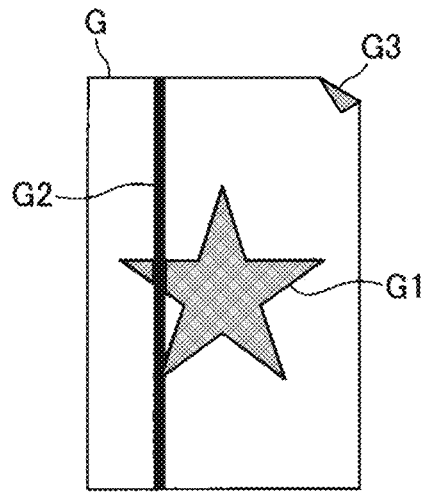
FIG. 10A is a diagram illustrating a read image including a star image formed on a sheet, a black streak generated due to adhesion of a foreign material onto the cover glass, and a black spot generated due to folding or bending of a sheet.
Figure 10B:
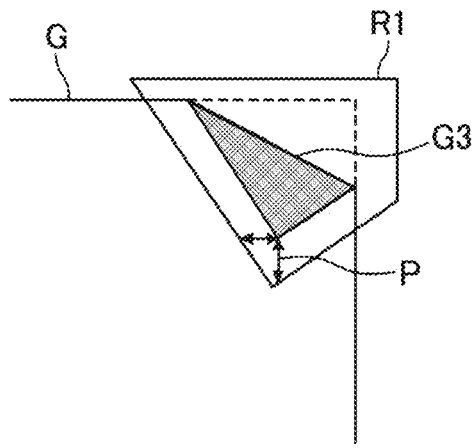
FIG. 10B is a diagram illustrating a non-detection area set with respect to the black spot.
Figure 10C:
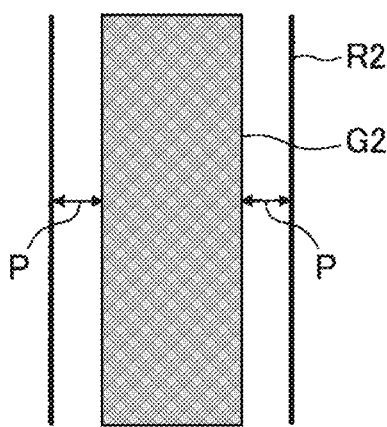
FIG. 10C is a diagram illustrating a non-detection area set with respect to the black streak.
Figure 10D:
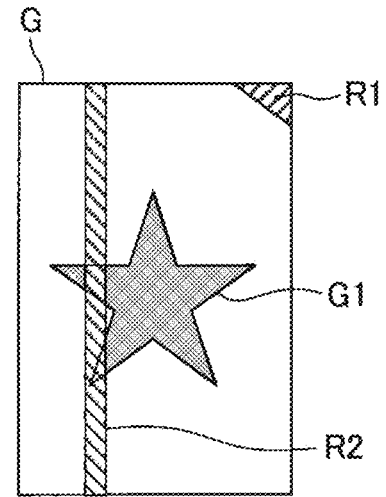
FIG. 10D is a diagram illustrating a read image in which the non-detection areas are set.

For example, the read image G illustrated in FIG. 10A includes an image G1 formed on the sheet S, the black streak G2 generated due to adhesion of the foreign material E1 onto the cover glass 133, and the folded portion G3 generated due to folding or bending of a sheet. In this case, when the detection results of the abnormality detector 140 satisfy the non-detection condition for both the black streak G2 and the folded portion G3, the controller 150 determines that these detection results are false, and then calculates the range of the non-detection area as illustrated in FIGS. 10B and 10C. To be more specific, the controller 150 calculates the ranges of non-detection areas R1 and R2 each extending outward by the predetermined number of pixels P, from the outer edges of the black streak G2 and the folded portion G3. As a result, the image abnormality within each of the set non-detection areas R1 and R2 is not detected in the subsequent image inspection, as illustrated in FIG. 10D.

The range of the calculated non-detection areas R1 and R2 may be adjusted based on a user instruction. In this case, for example, before starting a print job, the user operates the control panel 180 functioning as an instruction receiver of the image inspecting device 500 of the image forming apparatus 100 to instruct the degree of the range of the non-detection area to be calculated greater than the range of the image abnormality (range of the erroneously detected image abnormality) using, for example, the number of pixels P.

After the non-detection area is calculated as described above, the controller 150 determines whether to interrupt the print job (S10). In this determination, for example, before starting the print job, when the user operates the control panel 180 functioning as an instruction receiver and a command receiver of the image inspecting device 500 of the image forming apparatus 100 to instruct the setting of the non-detection area, in other words, when the job interruption function is set to ON (YES in S10), the print job is to be interrupted. On the other hand, when the user has not given the instruction, in other words, when the job interruption function is set to OFF (NO in S10)), the print job is not interrupted.

When it is determined that the print job is not to be interrupted (NO in S10), the controller 150 sets the non-detection area calculated in the process step S9 (S15) without interrupting the print job, in other words, while continuing the image forming operation, and stores the setting information of the non-detection area in the memory 170.

On the other hand, when it is determined that the print job is to be interrupted (YES in S10), the image forming operation is temporarily stopped and the print job is interrupted (S11). Then, the controller 150 displays the read image of the detection result information (image including the position and the shape dimension of the detected image abnormality) and the range (position and size) of the non-detection area calculated in the process step S9, on the control panel 180 of the image inspecting device 500 of the image forming apparatus 100 (S12).

The user views the display on the control panel 180 and sets a range (position and size) designated by the user as the non-detection area, instead of the range (position and size) of the non-detection area calculated in the process step S9 (S13). That is, when the user views the range of the calculated non-detection area displayed on the control panel 180 and uses the calculated non-detection area as it is, the user gives an instruction to use the calculated non-detection area, to the control panel 180 (NO in S13). By so doing, the controller 150 sets the non-detection area calculated in the process step S9 (S15), and then stores the setting information of the non-detection area into the memory 170.

On the other hand, when the user views the range of the calculated non-detection area displayed on the control panel 180 and sets the range designated by the user as the non-detection area, the user operates the control panel 180 to designate the range as the non-detection area (YES in S13). Accordingly, the controller 150 sets the non-detection area designated by the user instruction input to the control panel 180 (S14), and then stores the setting information of the non-detection area in the memory 170.

In the present embodiment, the user who interrupts the print job and views the control panel 180 can determine whether or not the image abnormality of the detection result satisfying the non-detection condition is actually false detection. It is assumed that the user views to determine that the image abnormality is not false detection but an image abnormality that is actually occurring is detected, the user may operate the control panel 180 and send an instruction to delete the non-detection area (user instruction operation for setting the non-detection area to zero).

Figure 11:
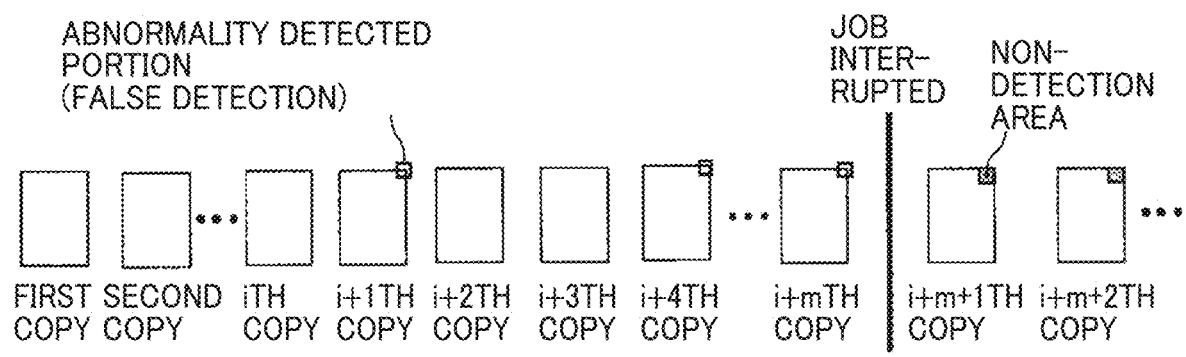
FIG. 11 is a diagram illustrating another non-detection condition according to an embodiment of the present disclosure.

FIG. 11 is a diagram illustrating another non-detection condition according to an embodiment of the present embodiment.

The non-detection condition illustrated in FIG. 11 is a condition that an abnormality is detected at the substantially same position (close position) in a specified number "n" (n☐m) of read images among a predetermined number "m" of read images that are continuously input. The controller 150 refers to the detection result information that is stored in the memory 170 since the start of the present print job and determines whether the detection result information satisfies a non-detection condition in which abnormalities are detected at the substantially same positions (close positions) in the specified number "n" of read images out of the predetermined number "m" of read images at the closest position (S8). In this example, when it is determined that the detection result information in the memory 170 satisfies the non-detection condition (YES in S8), the controller 150 calculates the range (position and size of the image abnormality) of the non-detection area, as described above (S9).

Note that the predetermined number m and the specified number "n" each may be a fixed numerical value determined in advance or may be a numerical value that is changeable by a user instruction. In a case in which the predetermined number "m" and the specified number "n" are changeable by a user instruction, a user operates the control panel 180 that functions as an instruction receiver of the image inspecting device 500 of the image forming apparatus 100, for example, before the start of a print job, so that the predetermined number "m" and the specified number "n" are designated.

The image abnormality that actually occurs on the sheet is discontinuous with a relatively long occurrence interval and occurs less frequently. Due to this configuration, according to the non-detection condition illustrated in FIG. 11, the controller 150 appropriately determines that an image abnormality caused by highly continuously occurring false detection factors is false detection and sets a non-detection area.

Note that the above-described embodiments provide an example of the image forming operation (print job) for producing a plurality of printed documents by continuously printing a plurality of pages of printed documents in page order but are not limited to this configuration. For example, the non-detection condition may be a condition that an abnormality is detected at the substantially same position (close position) in the specified number "x" of read images continuously input from the previous print job to the following print job (and may further include the next print job).

In addition, the above-described embodiments provide an example of a non-detection condition in which abnormalities are detected at the substantially same positions (close positions) in two or more inspection object images but may employ another condition in which the substantially same abnormalities are detected in two or more inspection object images. For example, a condition that abnormalities having the substantially same shape are detected in two or more inspection object images may be employed. In this case, for example, even when the folded portions G3 are detected at different positions from each other in two or more inspection object images, the non-detection condition is satisfied, and the non-detection area is set.

The configurations described above are examples, and aspects of the present disclosure provide respective effects as follows.

First Mode

In the first mode, an image inspecting device (for example, the image inspecting device 500) includes an abnormality detector (for example, the abnormality detector 140), and circuitry (for example, the controller 150). The abnormality detector is configured to detect an abnormality of an inspection object image (for example, the read image G). The circuitry is configured to set a non-detection area (for example, the non-detection area R1, R2) to be excluded from a detection object area within which the abnormality detector detects an image abnormality. The circuitry is configured to set an area including an abnormality detection portion as the non-detection area when a detection result obtained by the abnormality detector satisfies a non-detection condition.

In the present mode, when the image inspection is started, the abnormality detector detects image abnormality, and the detection result satisfies a predetermined non-detection condition, the circuitry sets an area including an abnormality detection portion corresponding to the detection result satisfying the non-detection condition as a non-detection area. With this configuration, the predetermined non-detection condition is appropriately set. By so doing, the false detection of the image inspection caused by a newly occurred false detection factor, from the detection result of the image abnormality obtained after the start of the image inspection, and the area in which the false detection has occurred is set as the non-detection area. According to this mode, such false detection caused by a new false detection factor generated after the start of image inspection is prevented.

Second Mode

In the second mode according to the first mode, the non-detection condition includes a condition that substantially same abnormalities are detected in two or more inspection object images.

When the false detection factors (e.g., adhesion of the foreign material E1 to the cover glass 133, folding or bending of a sheet, a sheet cutting defect, and sheet skew) that cause false detection (false detection of image abnormality) of the image inspection occur once, it is normal that such false detection factors occur continuously or highly frequently on each of the following sheets. On the other hand, in a case in which an image abnormality actually occurs on a sheet, it is normal that the image abnormality occurs discontinuously or less frequently. As a result, it is determined whether or not the detected image abnormality is false detection based on the above-described non-detection condition according to this mode, and a non-detection area that prevents a false detection of image inspection is set.

Third Mode

In the third mode according to the second mode, the substantially same abnormalities include an abnormality that is detected at substantially same positions in the two or more inspection object images.

When the false detection factors (e.g., adhesion of the foreign material E1 to the cover glass 133, folding or bending of a sheet, a sheet cutting defect, and sheet skew) that cause false detection (false detection of image abnormality) of the image inspection occur once, it is normal that such false detection factors occur at the substantially same positions continuously or highly frequently on each of the following sheets. As a result, according to this mode, it is more appropriately determined whether or not the detected image abnormality is false detection, and a non-detection area that prevents false detection of image inspection is set.

Fourth Mode

In the fourth mode according to the second mode or the third mode, the non-detection condition includes a condition that the substantially same abnormalities are detected in a specified number of inspection object images that are sequentially input or a condition that the substantially same abnormalities are detected in a specified number of inspection object images that are sequentially input, out of a predetermined number of inspection object images. The specified number is smaller than the predetermined number.

According to this configuration, it is more appropriately determined whether or not the detected image abnormality is false detection, and an appropriate non-detection area that prevents false detection of image inspection is set.

Fifth Mode

In the fifth mode according to any one of the first mode to the fourth mode, the image inspecting device (for example, the image inspecting device 500) further includes an instruction receiver (for example, the control panel 180) configured to receive a user instruction of whether or not to apply the non-detection area that is set by the circuitry. The circuitry (for example, the controller 150) is configured to, in response to an instruction of the instruction receiver to apply the non-detection area, set the area including the abnormality detection portion as the non-detection condition when the detection result satisfies the non-detection area. When the circuitry is configured to, in response to an instruction of the instruction receiver not to apply the non-detection area, not set the area including the abnormality detection portion as the non-detection area when the detection result satisfies the non-detection condition, the circuitry is configured not to set the non-detection area.

According to this mode, the circuitry sets the non-detection area when the non-detection condition is satisfied, and the user instruction, in other words, an optional instruction changes whether or not the non-detection area is applied as it is.

Sixth Mode

In the sixth mode according to any one of the first mode to the fifth mode, the image inspecting device (for example, the image inspecting device 500) further includes an instruction receiver (for example, the control panel 180) configured to receive an adjustment range of the non-detection area that is set by the circuitry. The circuitry is configured to set the adjustment range received by the instruction receiver, as the non-detection area.

According to this mode, whether the non-detection area that is set by the circuitry is adjusted in response to the user instruction, in other words, in response to an optional instruction.

Seventh Mode

In the seventh mode, an image forming apparatus (for example, the image forming apparatus 100) includes an image forming device (for example, the image forming device 110), an image reading device (for example, the image reading device 130), and the image inspecting device (for example, the image inspecting device 500) according to any one of the first mode to the sixth mode. The image forming device is configured to form an image on a recording medium (for example, the sheet S). The image reading device is configured to read the image on the recording medium formed by the image forming device. The image inspecting device is configured to inspect a read image read by the image reading device as an inspection object image.

This mode provides the image forming apparatus that prevents such false detection caused by a new false detection factor generated after the start of image inspection.

Eighth Mode

In the eighth mode according to the seventh mode, the image forming apparatus (for example, the image forming apparatus 100) further includes a memory (for example, the memory 170) configured to store detection result information of the abnormality detector. The image reading device is configured to sequentially read images formed on recording media in a continuous image forming operation of the image forming device. The abnormality detector (for example, the abnormality detector 140) is configured to detect an abnormality of a read image read by the image reading device in the continuous image forming operation. The memory is configured to store the detection result of the abnormality detector in the continuous image forming operation. The circuitry (for example, the controller 150) is configured to set the non-detection area based on the detection result stored in the memory in the continuous image forming operation. The abnormality detector is configured not to detect an abnormality in the non-detection area, in an image on a recording medium formed by a remaining image forming operation in the continuous image forming operation when the non-detection area is set in the continuous image forming operation.

This mode provides the image forming apparatus that prevents such false detection caused by a new false detection factor generated after the start of the continuous image forming operation.

Ninth Mode

In the ninth mode according to the seventh mode or the eighth mode, the image inspecting device (for example, the image inspecting device 500) further includes an instruction receiver (for example, the control panel 180) configured to receive the instruction of whether or not to apply the non-detection area that is set by the circuitry (for example, the controller 150). The circuitry is configured to, in response to an instruction of the instruction receiver to apply the non-detection area, set the non-detection area when the detection result satisfies the non-detection condition. When the circuitry is configured to, in response to an instruction of the instruction receiver not to apply the non-detection area not set the non-detection area when the detection result satisfies the non-detection condition. The image forming device is configured to stop a continuous image forming operation when the non-detection condition is satisfied in the continuous image forming operation is performed. The instruction receiver is configured to receive the instruction while the continuous image forming operation is stopped.

According to this mode, the user determines whether the continuous image forming operation is interrupted when the non-detection condition is satisfied. In other words, whether the continuous image forming operation is interrupted or not is optionally determined when the non-detection condition is satisfied. Due to such a configuration, the range of the non-detection area is adjusted.

Tenth Mode

In the tenth mode according to the ninth mode, the image inspecting device (for example, the image inspecting device 500) further includes a command receiver (for example, the control panel 180) configured to receive a command of whether to allow the image forming device (for example, the image forming device 110) to stop the continuous image forming operation.

According to this mode, when the non-detection condition is satisfied, the user determines whether the continuous image forming operation is interrupted, in other words, whether the continuous image forming operation is interrupted or not is optionally determined.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
an image forming device configured to sequentially form images on recording media in a continuous image forming operation of the image forming device;
an image reading device configured to sequentially read the sequentially formed images on the recording media in the image forming operation of the image forming device;
a memory; and
an imaging inspecting device including circuitry configured to inspect a read image of the sequentially read images read by the image reading device, detect an abnormality of the read image, determine a non-detection area of the read image in response to the abnormality satisfying a non-detection condition, store, in the memory, detection result information of the abnormality in the continuous image forming operation, set the non-detection area to be excluded from a detection area for detecting an image abnormality in an image on a recording medium formed by a remaining image forming operation in the continuous image forming operation, receive an input adjustment range of the non-detection area that is set by the circuitry, and set the input adjustment range as the non-detection area, wherein the image forming device is further configured to stop the continuous image forming operation in response to the non-detection condition being satisfied in the continuous image forming operation, and receive the input adjustment range while the continuous image forming operation is stopped.

2. The image forming apparatus according to claim 1, wherein the non-detection condition includes a condition that substantially same abnormalities are detected in two or more read images.

3. The image forming apparatus according to claim 2, wherein the substantially same abnormalities include abnormalities detected at substantially same positions in the two or more read images.

4. The image forming apparatus according to claim 2, wherein the non-detection condition includes a condition that the substantially same abnormalities are detected in a specified number of read images that are sequentially read, or the substantially same abnormalities are detected in a first number of read images out of a second number of read images that are sequentially read, the first number being smaller than the second number.

5. The image forming apparatus according to claim 2, wherein the non-detection condition includes a condition that the substantially same abnormalities are detected in a first number of read images out of a second number of read images that are sequentially read, the first number being smaller than the second number.

6. The image forming apparatus according to claim 2, wherein the substantially same abnormalities include abnormalities having a same shape and different dimensions, or abnormalities having a different shape and same dimensions.

7. The image in forming apparatus according to claim 2, wherein the circuitry is configured to set a user-defined non-detection area based on a user input.

8. The image forming apparatus according to claim 1, wherein the circuitry is further configured to:

receive an instruction of whether to apply the non-detection area that is set;

set the area including the abnormality as the non-detection area when the detection result satisfies the non-detection condition in response to an instruction to apply the non-detection area; and not set the area including the abnormality as the non-detection area when the detection result satisfies the non-detection condition in response to an instruction not to apply the non-detection area.

9. The image forming apparatus according to claim 1, wherein the circuitry is configured to not detect an abnormality in the non-detection area in an image on a recording medium formed by a remaining image forming operation in the continuous image forming operation.

10. The image forming apparatus according to claim 1, wherein the circuitry is configured to receive an order of whether to allow the image forming device to stop the continuous image forming operation.

11. The image forming apparatus according to claim 1, wherein the circuitry is configured to receive an instruction, when a continuous image forming operation is stopped, of whether to apply the non-detection area, set the non-detection area when the detection result satisfies the non-detection condition in response to receiving an instruction to apply the non-detection area, not set the non-detection area when the detection result satisfies the non-detection condition, in response to receiving an instruction not to apply the non-detection area, and wherein the image forming device is configured to stop the continuous image forming operation in response to the non-detection condition being satisfied in the continuous image forming operation.

12. The image forming apparatus according to claim 11, wherein the circuitry is configured to receive a command of whether to allow the image forming device to stop the continuous image forming operation.

13. The image forming apparatus according to claim 1, wherein the circuitry is configured to adjust a range of the non-detection area based on the abnormality and a given degree of range.

14. The image forming apparatus according to claim 13, wherein the circuitry is configured to receive the given degree of range via a user input.

* * * * *